United States Patent
Olsson et al.

(10) Patent No.: US 6,370,980 B1
(45) Date of Patent: Apr. 16, 2002

(54) MOTOR VEHICLE GEARBOX

(75) Inventors: Ronald Olsson, Savedalen; Sverker Alfredsson, Vastra Frolunda; Stig-Erik Johannesson, Kungalv, all of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/581,641

(22) PCT Filed: Dec. 15, 1998

(86) PCT No.: PCT/SE98/02308

§ 371 Date: Aug. 8, 2000

§ 102(e) Date: Aug. 8, 2000

(87) PCT Pub. No.: WO99/31409

PCT Pub. Date: Jun. 24, 1999

(30) Foreign Application Priority Data

Dec. 15, 1997 (SE) ............................................. 9704670

(51) Int. Cl.[7] ............................................... B60K 20/00
(52) U.S. Cl. ............... 74/473.24; 74/336 R; 74/473.19; 74/745; 475/209
(58) Field of Search ........................ 74/336 R, 473.19, 74/473.2, 473.24, 745; 475/209

(56) References Cited

U.S. PATENT DOCUMENTS

| | | | |
|---|---|---|---|
| 4,060,005 A | 11/1977 | Bost | |
| 4,409,859 A | 10/1983 | Yarnell | |
| 4,507,736 A | * 3/1985 | Klatt | 701/52 |
| 4,986,142 A | 1/1991 | Borodin et al. | |
| 5,054,591 A | 10/1991 | Braun | |
| 5,471,893 A | * 12/1995 | Newbigging | 74/335 |

* cited by examiner

*Primary Examiner*—Allan D. Herrmann
(74) *Attorney, Agent, or Firm*—Young & Thompson

(57) ABSTRACT

A vehicle gearbox includes a basic gearbox with a main shaft that is an input shaft to a high-low range gearset joined to the basic gearbox. The basic gearbox has a control shaft, which, rotated in either direction from a neutral position, engages a selected gear. The control shaft is coordinated with a lock-out device which is controlled by a first sensor, which senses the speed of the output shaft from the range gearbox, and a second sensor which senses the engaged range in the range gearbox. An operating device holds the lock-out device in a lock-out position which prevents rotation of the control shaft towards the position for the lowest synchronized gear in the basic box, when the vehicle speed exceeds a predetermined speed in the low range of the gearbox.

8 Claims, 2 Drawing Sheets

MOTOR VEHICLE GEARBOX

BACKGROUND OF THE INVENTION

The present invention relates to a vehicle gearbox, comprising a basic gearbox with an input shaft mounted in a housing, at least one lay shaft driven by the input shaft, a main shaft, pairwise interengaging gears carried by the lay shaft and the maimshaft, of which at least one gear in each pair is freely rotatably mounted on its shaft and is lockable on its shaft by means of an engaging sleeve nonrotatably but axially displaceably disposed on the shaft, said engaging sleeve cooperating with synchronizing means, a shift control, the movement of which in one direction from a neutral position via motion-transmitting elements produces displacement of an engaging sleeve to an engaging position, and the movement of which from the neutral position in another direction produces a displacement of another engaging sleeve to an engagement position, and a high-low range gearbox with an output shaft and lock-out means comprising a blocking element with operating means, which under predetermined operating conditions holds the blocking element in a lock-out position in which it inhibits movement of the shift control.

It is previously known to provide a gearbox of the type described above, having a main shaft coupled to a subsequent range gearbox of planetary type, for example, as described in SE 8306735-5, with lock-out means to prevent misshifting. A lock-out function which prevents shifting in the basic gearbox from the point in time when shifting in the range gearbox has been initiated until this shifting has been completed, i.e. when the shift selector mechanism: has returned to its inactive position, utilizes a sensor which cooperates with the operating cylinder of the range gearbox and senses the position of its piston rod. When the driver preselects a new range (low to high or vice versa), the shifting is initiated by air being supplied to the operating piston of the range gearbox, as soon as the shift lever of the gearbox reaches the neutral position. During the initial movement of the operating cylinder, a valve, under the influence of the sensor, controls the compressed air to an operating cylinder connected to the blocking element and the operating cylinder moves the blocking element to a position in which it locks the controller shaft in the neutral. the blocking element to a position in which it locks the controller shaft in the neutral position. When the shifting of the range gear has been completed, the operating cylinder of the blocking element is evacuated and spring means cooperating with the blocking element move the blocking element out of its blocking engagement, so that a new gear can be engaged in the basic gearbox.

Another preventer function which prevents shifting from high range to low range at speeds above a predetermined speed, uses a speed sensor which controls a magnetic valve in the compressed air supply line to the operating cylinder of the range gearbox. When the vehicle speed exceeds the predetermined speed limit, the magnetic valve closes and prevents compressed air from being supplied to the operating cylinder.

In gearboxes for heavy trucks, both with and without a range gearbox, with means of the type described above to prevent misshifting, there are at times so-called servo-synchronizers. Such synchronizers use the rotational energy of the rotating parts of the gearbox itself to reduce the shift lever force required for the synchronizing work. In principle, shifting, after manual initiation of the synchronizing sequence (a slight movement of the shift lever from the neutral position towards a gear-engaged position) may be effected entirely by the servo-system. This, however, involves a number of risks. In a known gearbox with a basic gearbox and a high-low range gearbox, the lever position for fourth gear will be the same as for first gear. When shifting from third to fourth, the low range gear engaged in the range gearbox must first be shifted to high range and third must then be shifted to first in the basic gearbox. Shifting in the range gearbox is normally done by pre-selection with a selector placed on the gear lever of the basic gearbox, and the shifting itself is initiated when the gear lever reaches the neutral position, where it is kept blocked as long as the shift mechanism in the range gearbox is in motion. If, however, the driver forgets to preselect the high range when shifting from third to fourth, the result will instead be, unintentionally, an attempt to engage first gear.

Since the shifting mechanism in the range gearbox is not in movement, the gear lever of the basic gearbox will not be blocked and the driver can move the lever into the position for first gear. With conventional synchronizing devices, due to the great difference in rotational speed when shifting down from third to first, this shifting will be so difficult that the driver will notice that he is attempting to engage the wrong gear. With servo-synchronizers or other effective synchronizing means, for example triple synchronizers, this will not be noticed as clearly and the shifting can be completed, with a risk of serious mechanical damage, for example, exploding clutch leaves, which can result in personal injury.

The purpose of the present invention is to achieve a gearbox of the type described by way of introduction, which is so equipped that the described misshifting, caused by forgetting to shift from low range to high range, cannot be completed.

This is achieved according to the invention by virtue of the fact that the operating means of the blocking element are coordinated with a first sensor disposed to sense the speed of the output shaft of the range gearbox, and a second sensor disposed to sense the engaged range in the range gearbox, and that the operating means holds the blocking element in a lock-out position, which prevents movement of the shift control towards the position for the lowest synchronized gear in the basic gearbox, when said speed exceeds a predetermined speed in the low range of the range gearbox.

BRIEF DESCRIPTION OF THE DRAWINGS

The invention will be described in more detail with reference to examples shown in the accompanying drawings, where.

Figure 1:
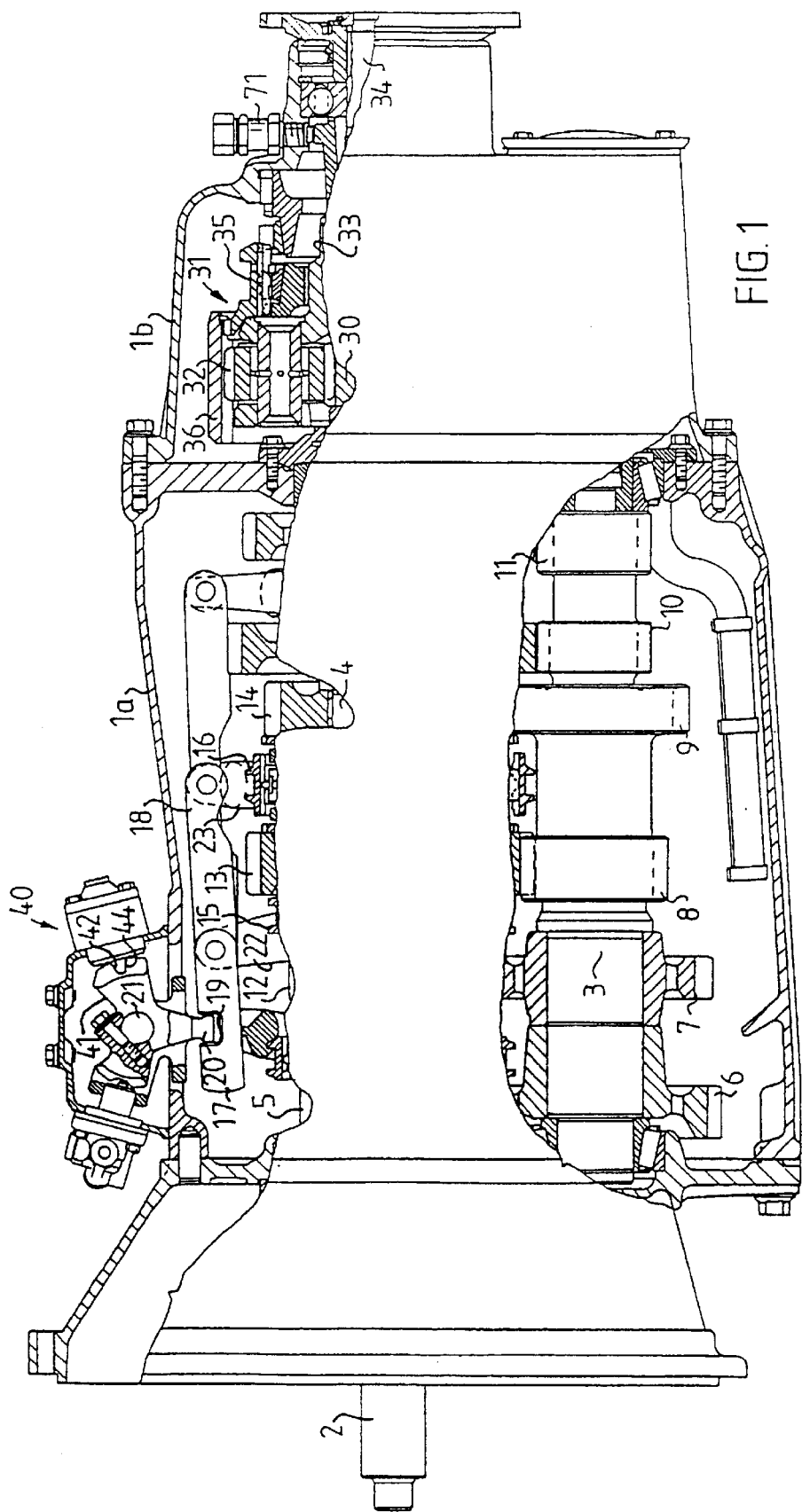
FIG. 1 shows a partial cut-away side view of a gearbox according to the invention with a basic gearbox and a range gearbox.
Figure 2:
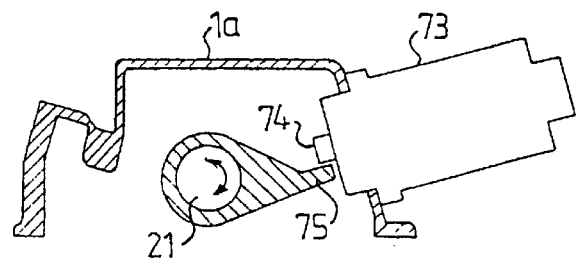
FIG. 2 shows a cross section through a lock-out mechanism for the gearbox shown in FIG. 1.

DETAILED DESCRIPTION OF THE REFERRED EMBODIMENTS 1a in FIG. 1 designates the housing of a basic gearbox, in which an input shaft 2, a lay shaft 3 and a main shaft 4 are mounted. The input shaft 2 drives the lay shaft 3 via a pair of gears 5 and 6, respectively, on the respective shaft. On the lay shaft 3, there are five additional gears 7, 8, 9, 10 and 11 fixed, of which the gears 7, 8 and 9 engage gears 12, 13 and 14, rotatably mounted on the main shaft 4, and which are lockable to the main shaft 4 with the aid of axially displaceable engaging sleeves 15 and 16, respectively, which cooperate with synchronizing devices (not shown in more detail here) of a type known per se. These can, for example, be of the type shown and described in SE-A-502 042, i.e. so-called servo-synchronizers. First, second and third gears are obtained by locking the gear 13, the gear 14 or the gear 12, respectively, in said order, to the main shaft 4 by displacing the respective engaging sleeve 15, 16 with the aid of the gear shift mechanism. This mechanism comprises a pair of shifting rods 17, 18, each having a notch 19, into which a finger 20 on a control shaft 21 can be inserted. The shifting rod 17 is pivotally joined to a shifting fork 22, which is pivotally mounted in the gearbox housing 1a and engages the engaging sleeve 15. The shifting rod 18 is pivotally joined to a shifting fork 23 which is mounted in the gearbox housing and which engages the engaging sleeve 16. The control shaft 21 is mounted transverse to the axial direction of the gearbox and is displaceable in this direction as well as being rotatable. When the control shaft 21 is displaced axially, the finger 20 is moved laterally out of engagement with the notch 19 in a shifting rod 17 or 18 and into the corresponding notch in an adjacent shifting rod 18 or 17. By rotating the control shaft 21 there is achieved a displacement of one of the shifting rods with corresponding pivoting of the associated shifting fork 22 or 23 and engagement or disengagement of first, second or third gear.

On an end of the main shaft 4 extending out of the housing 1a, there is fixed a sun gear 30 in a planetary gear set, generally designated 31. The planetary gear set 31 is enclosed in a housing 1b, which is screwed securely to the housing 1a. The sun gear 30 engages planet gears 32, which are carried by a planet gear carrier 33, which is solidly joined to an output shaft 34. With the aid of an axially displaceable engaging sleeve 35, a ring gear 36 engaging the planet gears 32 can either be connected to the housing 1b, whereupon the rotational speed of the output shaft 34 is reduced (low range) in relation to the rpm of the main shaft 4, or to the planet gear carrier 33, whereupon said shafts are locked together for direct drive (high range) of the output shaft 34. The gear ratio in the range gear ring formed by the planetary gear set 31 is selected so that the shift position for first gear in the basic gearbox provides fourth gear, the position for second gear provides fifth gear and the position for third gear provides sixth gear when the high range is engaged in the range gearbox. This means that fourth gear has the same gear lever position as first gear, fifth gear has the same gear lever position as second gear and sixth gear has the same gear lever position as third gear.

The gearbox has a neutral position lock mechanism, generally designated 40, comprising a cam element 41, which in the example shown is integral with the shift finger 20 on the control shaft 21 and which is consequently fixed relative to the control shaft. The cam element 41 is provided with a V-shaped groove 42, into which there extends an end 44 of a lock plunger in a compressed-air cylinder. The cam element 41 and the groove 42 extend far enough in the axial direction of the control shaft 21, that a portion of the groove 42 in the neutral position is always opposite the end of the lock plunger regardless of the lateral position of the control shaft 21. With the end of the lock plunger inserted in the groove 42 and the cam element 41, the control shaft 21 is blocked against rotation, which means that the basic gearbox shift lever (not shown) joined to the control shaft, cannot be moved from the neutral position without great resistance.

The neutral position lock mechanism is controlled mechanically by a piston rod 62, which is joined to a piston 63 in a compressed-air cylinder 64. The piston rod 62 is joined to a shifting fork 65, which engages the engaging sleeve 35 of the range gear set (see FIG. 3). The piston rod 62 is made with a pair of depressions 66, 67, which represent the two shift positions of the range gear set, i.e. low range and high range. When a sensor 68 cooperating with the valve 50 projects into one of the depressions 66 or 67, the valve 50 is in a position in which the neutral position lock mechanism is in its unlocked position. As soon as the piston rod 62 begins to be displaced to effect shifting in the range gearbox, the sensor 68 is pressed upwards, and the valve 50 will move the neutral position lock mechanism to its locked position to lock the control shaft 21 in the neutral position. Thus, shifting in the basic gearbox is prevented before shifting has been completed in the range gearbox. As soon as the shifting in the range gearbox has been completed and the sensor 68 penetrates into one of the depressions 66 or 67, the lock cylinder 46 is evacuated, and the lock plunger 44 is moved out of its locking engagement by a spring in the cylinder.

Figure 3:
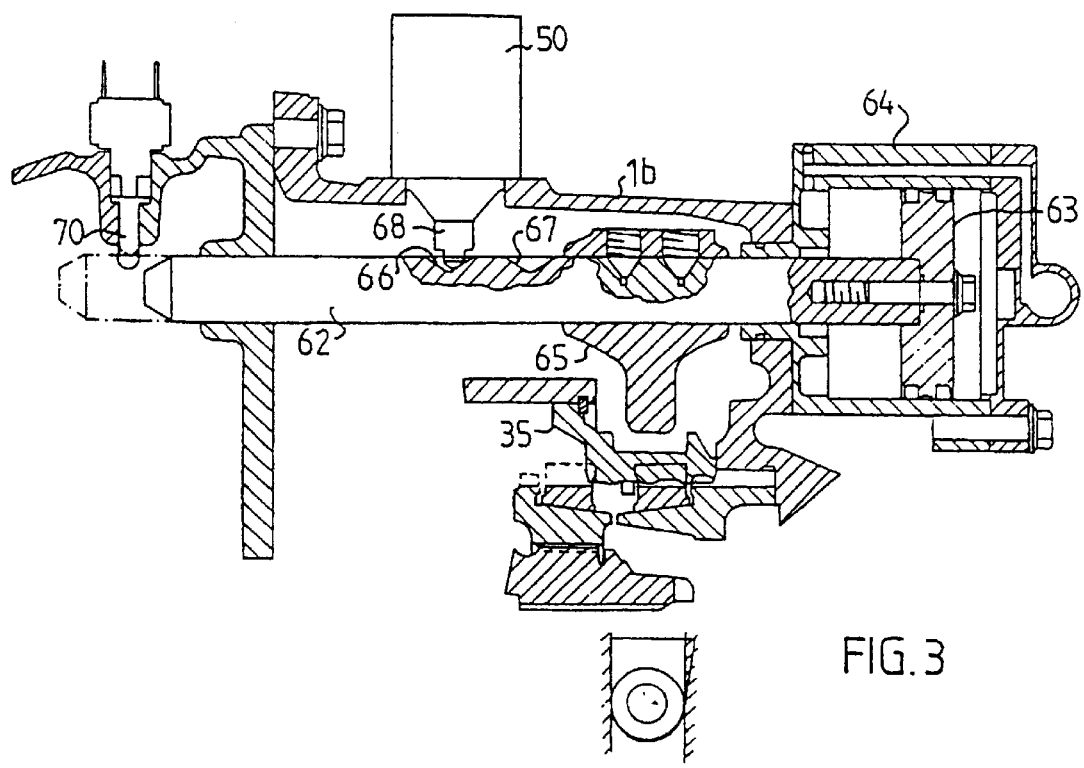
FIG. 3 shows a longitudinal section through a portion of the range gearbox comprising an operating cylinder.

The piston rod 62 also cooperates with a sensor 70 which changes position (is pressed in), when the piston rod 62 changes position, for example from the low range position shown in FIG. 3 with the piston rod in its righthand end position (as seen in FIG. 3) to its high range position to the left (indicated with dash-dot lines). The sensor 70 thus provides an output signal representing the selected high-low range selection. This signal, together with a signal representing the rotational speed of the output shaft, which is obtained from the vehicle speedometer 71 (FIG. 1), is fed into a control relay (not shown), which controls the voltage to an operating means in the form of an electromagnet 73, the armature of which is joined to a lock-out pin 74. The operating means 73 is so disposed in the gearbox housing 1a that the lock-out pin 74 is directly opposite a lock-out arm 75 solidly joined to the control shaft to one side of the neutral position lock mechanism, when the control shaft in the neutral position is in the lateral position for shifting to the lowest synchronized low range gear speed.

When the speed sensor 71 indicates a vehicle speed exceeding the predetermined speed range at the same time as the shift position sensor 70 indicates that low range is engaged in the range gearbox, the operating means 73 will hold the lock-out pin 74 in the lock-out position, so that the lowest synchronized low range gear speed cannot be engaged. Since the lock-out pin 74 in the lock-out position is only in contact with one side of the lock-out arm 75, the control shaft 21 can be rotated freely in the opposite direction to other gear selections.

Only when high range in the range gearbox is engaged or the vehicle speed has dropped below the predetermined speed range, will the lock-out element 74 retract from the lock-out position so that the lowest synchronized low range gear speed can be engaged.

What is claimed is:

1. Vehicle gearbox, comprising: a basic gearbox with an input shaft (2) mounted in a housing (1a), at least one lay shaft (3) driven by the input shaft; a main shaft (4); pairwise interengaging gears (7,12,8,13,9,14) carried by the lay shaft and the main shaft, of which at least one gear (12,13,14) in each pair is freely rotatably mounted on its shaft and is lockable on its shaft by means of an engaging sleeve (15,16) nonrotatably but axially displaceably disposed on the shaft, said engaging sleeve cooperating with synchronizing means; a shift control (21), the movement of which in one direction from a neutral position via motion-transmitting elements (17,18) produces displacement of one engaging sleeve (15)

to an engaging position, and the movement of which from the neutral position in another direction produces a displacement of another engaging sleeve (16) to an engagement position; and a high-low range gearbox with an output shaft (34) and lock-out means comprising a blocking element with operating means, which under predetermined operating conditions holds the blocking element in a lockout position in which it inhibits movement of the shift control, characterized in that the operating means (73) of the blocking element (74) are coordinated with a first sensor (71) disposed to sense the speed of the output shaft (34) of the range gear-box, and a second sensor (70) disposed to sense the engaged range in the range gearbox, and that the operating means holds the blocking element in a lockout position which prevents movement of the shift control towards the position for the lowest synchronized gear in the basic gearbox, when said speed exceeds a predetermined speed in the low range of the range gearbox.

2. Vehicle gearbox according to claim 1, characterized in that the shift control (21) is a control shaft axially displaceably and rotatably mounted perpendicular to, said shafts (2,3,4), the rotational movement of said control shaft from the neutral position via the motion-transmitting elements (17,18,22,23) in a first axial position effecting displacement of an engaging sleeve (15) to an engagement position and the rotational movement of said control shaft from the neutral position in a second axial position effects displacement of another engaging sleeve (16) to an engagement position.

3. Vehicle gearbox according to claim 1, characterized in that the second sensor (70) senses the position of a piston rod (62), which is connected to a pressure medium actuated piston-cylinder device (63,64) and to an engaging sleeve (35) which is displaceable by means of the piston-cylinder device between a first position, in which the low range of the range gearbox is engaged, and a second position in which its high range is engaged.

4. Vehicle gearbox according to claim 2, characterized in that the lock-out means comprise a lock-out arm (75) solidly joined to the control shaft (21) and a lock-out pin (74), being so arranged relative to each other that the lock-out pin, by means of the operating means (73) is displaceable to a lock-out position, in which it prevents rotation of the control shaft in the direction towards the position for the lowest synchronized gear speed in the basic gearbox, but permits rotation of the control shaft in the opposite direction.

5. Vehicle gearbox according to one of claim 1, characterized in that the operating means of the blocking element (74) is an electromagnet (73) and that the second sensor is an electric switch (70).

6. Vehicle gearbox according to claim 2, characterized in that the second sensor (70) senses the position of a piston rod (62), which is connected to a pressure medium actuated piston-cylinder device (63,64) and to an engaging sleeve (35) which is displaceable by means of the piston-cylinder device between a first position, in which the low range of the range gearbox is engaged, and a second position in which its high range is engaged.

7. Vehicle gearbox according to claim 3, characterized in that the lock-out means comprise a lock-out arm (75) solidly joined to the control shaft (21) and a lock-out pin (74), being so arranged relative to each other that the lock-out pin, by means of the operating means (73) is displaceable to a lock-out position, in which it prevents rotation of the control shaft in the direction towards the position for the lowest synchronized gear speed in the basic gearbox, but permits rotation of the control shaft in the opposite direction.

8. Vehicle gearbox according to claim 6, characterized in that the lock-out means comprise a lock-out arm (75) solidly joined to the control shaft (21) and a lock-out pin (74), being so arranged relative to each other that the lock-out pin, by means of the operating means (73) is displaceable to a lock-out position, in which it prevents rotation of the control shaft in the direction towards the position for the lowest synchronized gear speed in the basic gearbox, but permits rotation of the control shaft in the opposite direction.

* * * * *